Jan. 7, 1964     H. E. WEIR     3,116,642
FLUID SAMPLING DEVICE
Filed Feb. 28, 1961
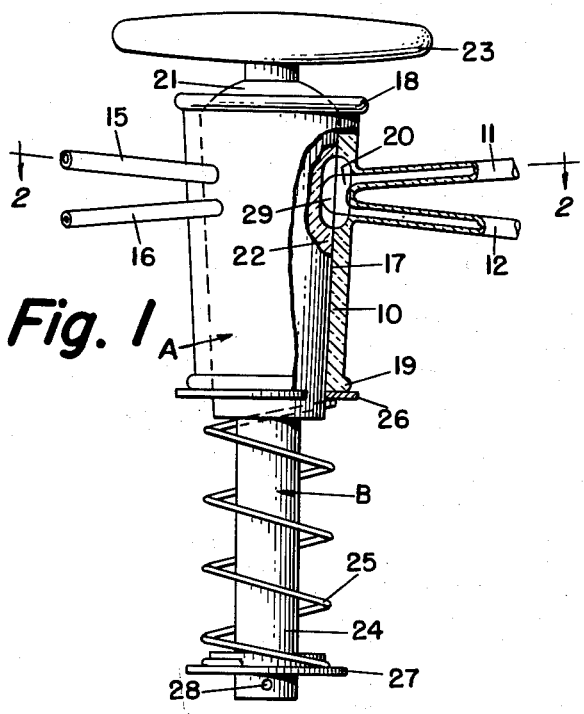
Fig. 1
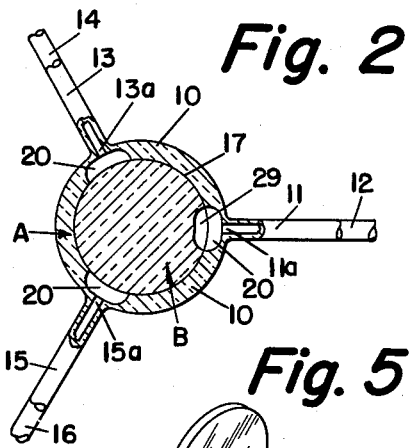
Fig. 2
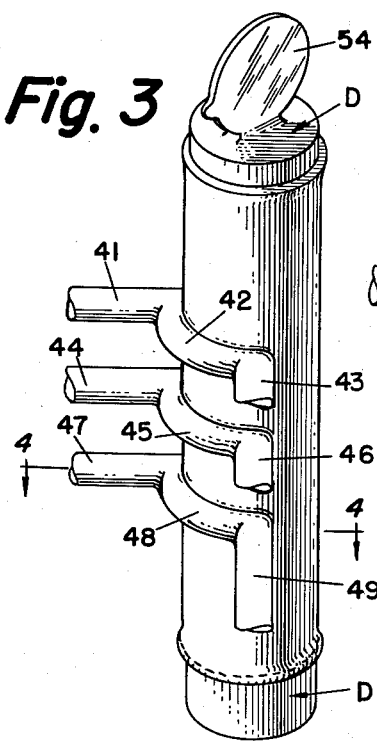
Fig. 3
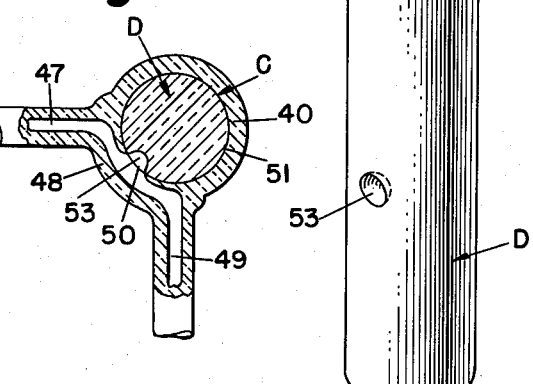
Fig. 4
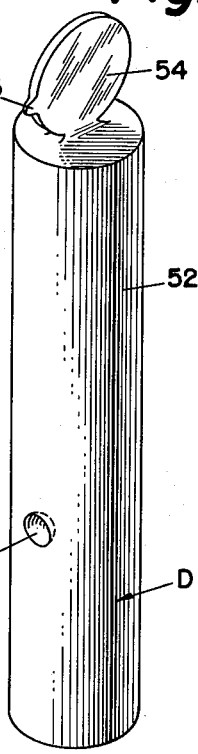
Fig. 5
INVENTOR.
HARRY E. WEIR
BY 
ATTORNEY

United States Patent Office 3,116,642
Patented Jan. 7, 1964

3,116,642
FLUID SAMPLING DEVICE
Harry E. Weir, Wilmington, Del., assignor to Atlas Chemical Industries, Inc., Wilmington, Del., a corporation of Delaware
Filed Feb. 28, 1961, Ser. No. 92,367
7 Claims. (Cl. 73—422)

This invention relates to fluid sampling devices. More particularly, it relates to fluid sampling devices which can be used to withdraw a sample of a fixed volume from a given gas or liquid stream and transfer it to another stream without interrupting the flow continuity of either stream.

Although the invention has broad areas of utilization, it was developed in connection with laboratory problems of fluid analysis. Thus, for instance, current laboratory analysis techniques often utilize instruments such as the mass spectrometer for quick, accurate quantitative analysis of liquids and gases. Often it is necessary to periodically sample one or more flow streams of a continuous process and, particularly when dealing with small fluid flow quantities, it is important not to upset steady flow conditions while the sample is being withdrawn. The invention is also useful in connection with vapor phase fractometry or chromatography wherein a fluid carrier stream is used to introduce the sample to the instrument. The invention allows transfer of a sample from the process stream to the carrier stream without upsetting steady state conditions.

Prior art devices which have dealt with this problem have been numerous and have often involved rather complex and sophisticated apparatus. These devices generally may be characterized as valves containing a sample chamber or channel which is adapted to be placed in series with either a given process stream or a carrier stream. When one element of the apparatus is moved what is, in effect, a switching operation is performed and the sampling chamber is taken out of one stream and placed in series with the other. Aside from the complexities of structure and consequent high initial cost, the main problem with these devices is inherent in their design. Namely, during the switching interval flow continuity of the process stream or streams is completely cut off, a condition likely to produce an imbalance particularly when small quantities of fluid are involved.

Accordingly, it is an object of the invention to provide a fluid sampling apparatus which can be used to transfer samples of fixed volume from one stream to another or from one of a plurality of streams to another without interrupting flow in any of the streams involved.

It is also an object of the invention to provide a fluid sampling device which takes a sample of fixed, known volume each time a sampling operation is performed.

A further object of the invention is to provide a device which can take samples quickly and with a minimum of effort.

Other objects of the invention are to provide an improved device of the character described that is easily and economically produced, requires a minimum of maintenance, is sturdy in construction and highly efficient in operation.

With the above and related objects in view, said objects being apparent to those skilled in the art, consideration should now be given to the following detailed description of representative embodiments of the invention. The description is intended to be considered in connection with the accompanying drawings wherein:

FIGURE 1 represents a perspective view, partially cut away, of a sampling device operated by rotary motion which embodies the invention.

FIGURE 2 represents a section taken along line 2—2 of FIGURE 1.

FIGURE 3 represents a perspective view of an assembled sampling device, operated by either reciprocal motion or combined rotary and reciprocal motion, which also embodies the invention.

FIGURE 4 represents a section taken along 4—4 of FIGURE 3.

FIGURE 5 represents a perspective view of the reciprocating and/or rotating portion of the device shown in FIGURE 3.

Referring now to the drawings, wherein like reference numerals indicate like parts, it will be observed that the embodiment of the invention shown in FIGURES 1 and 2 includes a body portion or housing A in which is mounted a rotatable plug B. The device bears a superficial resemblance to a conventional stop cock.

The housing A may be generally described as a hollow cylinder and includes a wall or walls 10, and a plurality of associated paired conduits such as, for example, inlet 11 and outlet 12; inlet 13 and outlet 14; inlet 15 and outlet 16. These conduits are preferably integral with the housing A and, within the wall 10 may take the form of drilled passageways (e.g. 11a, 13a, 15a) extending from the exterior of the housing A toward the hollow interior thereof. Obviously, if desired, one could drill and tap these passageways and threadedly attach the conduits. As shown in FIGURE 2, three pairs of conduits are provided and these have, as a matter of convenience, been spaced 120° apart. Housing A is further provided with an internal tapered bore having a smooth face 17, an upper flange 18 and a lower flange 19. Within the wall 10 a plurality of channels 20 are provided connecting the inlet and outlet passageways of each pair of conduits. These channels are preferably designed to have an effective cross section at least as great as that of the conduits they connect to minimize their effect on fluid flow rate. Further, they open into the bored interior of housing A and are recessed into face 17. In the preferred construction, this opening extends for substantially the entire length of the said channels.

Within the housing A is movably mounted a tapered plug B. As shown, the plug includes a body portion 21, having a smooth face 22 which matches internal face 17 of the housing A, a handle 23 and an integral shank 24. The matching faces 17 and 22 form a fluid-tight seal which may be effected in known manner as, for example, by machining, grinding, lapping, polishing, etc. and aided, if desired, by a film of lubricant. The plug B may be retained within the housing A in any conventional manner such as by the use of resilient means to urge the tapered plug into the matching internal taper of the housing. As shown, a compressed spring 25 acts between an upper washer 26 and a lower washer 27 to urge shank 24 downwardly. Washer 26 abuts lower housing flange 19 and washer 27 is fixed with respect to shank 24 by pin 28 which passes therethrough.

The surface of plug B is indented to form a sample cavity 29 which is recessed into body portion 21 and opens into face 22. The opening of this cavity preferably, but not necessarily, has the same dimensions as channels 20 but must, of necessity, substantially overlap each of said channels when in angularly aligned relationship. The cavity may be formed with any desired volume.

The operation of the embodiment shown in FIGURES 1 and 2 is relatively simple and foolproof. Assume that conduits 11 and 12 represent, respectively, the inlet and outlet of a first process stream; that conduits 13 and 14 represent, respectively, the inlet and outlet of a second process stream; and that conduits 15 and 16 represent the inlet and outlet of a carrier stream which is connected to a vapor fractometry apparatus. It is immediately apparent that flow through each of these paired conduits, via their associated passageways and channels 20 is unobstructed and will remain so regardless of the orientation of plug B. When it is desired to sample the fluid in conduits 11 and 12, the handle 23 is turned so that the relationships are those shown in FIGURE 2. The apparatus may be indexed, of course, so that these points may be rapidly and positively located. As shown in FIGURE 2, cavity 29 abuts channel 20 and is in fluid communication therewith. The cavity is thus filled with a sample of the material flowing in conduits 11 and 12. To transfer the sample in cavity 29 to the carrier stream it is merely necessary to turn the plug 120° (clockwise as shown in FIGURE 2) whereby the sample will be swept out of the cavity and into the carrier stream. The contents of conduits 13 and 14 may be sampled in an analogous manner. Faces 17 and 22 are in sealing juxtaposition at all times so that rotation of plug B causes no leakage problems.

Turning now to a consideration of the embodiment shown in FIGURES 3-5 inclusive, it will be seen as the description progresses that this is but another embodiment of the same invention. As shown best in FIGURE 3, this embodiment also includes a body portion or housing C and a movable plug D which fits within the housing.

In the specific apparatus illustrated, the housing C is cylindrical having an internal bore of fixed diameter and includes wall or walls 40 and a plurality of paired conduits such as inlet 41 and outlet 43; inlet 44 and outlet 46; and inlet 47 and outlet 49. Each of these paired conduits terminates within the wall 40 as a passageway and the respective passageways are connected by a channel 50 which opens into the smooth interior face 51 of the housing C. The channels 50 meet the same design criteria as do channels 20 and differ only in that they connect the two passageways in a horizontal rather than a vertical plane. If it is desired to keep the walls 40 as thin as possible, then the housing C may be built up in the vicinity of the passageways and channels as shown at 42, 45 and 48.

The plug D includes an exterior surface 52 which is in sealing relation with housing face 51 and at least one sampling cavity 53. It may also be provided with a handle 54 and an indexing indicator 55. Due to the machining of faces 51 and 52, the plug D is movably retained in housing C but obviously additional or alternate conventional retention and limit means such as flanges, detents and the like may be employed.

The operation of the device is similar to the operation previously described. Assume that in paired conduits 41—43 and 47—49 are process streams and that a carrier stream is flowing in conduits 44—46. Handle 54 is rotated so that cavity 53 is in vertical alignment with vertically aligned channels 50. Vertical reciprocal motion of plunger or plug D will then enable the cavity to be brought in juxtaposition with any of the three paired conduits. In the position illustrated by FIGURES 3 and 4 the cavity 53 is being filled with fluid from line 47—49. When the plunger is then elevated a distance equal to the vertical distance between 44 and 47, the fluid sample is swept from the cavity into the carrier stream. If handle 54 is rotated, the plunger may be reciprocated without ever aligning the cavity 53 with any of the channels 50 and this combined rotational and reciprocal motion may be taken advantage of to transfer material from 47—49 to 41—43, completely by-passing 44—46. Similarly, plug D may be provided with a plurality of cavities of different capacity angularly spaced apart around its perimeter. The only operating cavity at a given time would be the one in vertical alignment with channels 50. Yet, were it desired to use samples of different volume, it would be only a matter of rotating handle 54 through a predetermined arc, to bring the new cavity into vertical alignment with channels 50, prior to reciprocation of the plug D. As in the previous embodiment, surfaces 51 and 52 are in fluid-sealing juxtaposition at all times.

If it is desired to operate a sampling device by reciprocating motion only the housing and plug need not be cylindrical as illustrated in FIGURES 3 to 5 but may be of any desired cross section such as oval or elliptical, rectangular, and the like.

The apparatus of the invention may be constructed from a wide variety of materials provided only that the materials are impervious and chemically resistant to the fluids being sampled. Examples of suitable materials include glass, ferrous and non-ferrous metals, plastics, ceramics, and the like. Potential contamination of the fluid samples may be minimized by employing self-lubricating materials of construction, such as tetrafluoroethylene resins, thus avoiding the necessity of sealing lubricants.

While particular embodiments of the invention have been illustrated and described herein, it is not intended to limit the invention to such specific disclosure but changes and modifications may be made therein and thereto within the scope of the following claims.

What is claimed is:

1. A sampling device comprising a body portion having walls and a hollow interior, said walls containing a plurality of spaced apart pairs of associated inlet and outlet passageways extending from the exterior of said housing toward the hollow interior thereof; channels, open to the interior of said housing, formed in said walls, each connecting an associated inlet and outlet passageway; a movable plug adjustably positioned within said hollow interior portion, the surfaces thereof being in sealing juxtaposition to said channels; a cavity of fixed volume located in the face of said plug; means for moving said plug within said hollow interior of said body; movement of said plug enabling said cavity to be placed in matching alignment with any of said channels to that fluid flowing through a given associated inlet and outlet pair fills said cavity.

2. The device of claim 1 wherein the effective cross section of said channel is at least as great as that of its associated passageways.

3. The device of claim 2 wherein said plug rotates about the longitudinal axis of said body portion.

4. The device of claim 2 wherein the motion of said plug is reciprocal along the longitudinal axis of said housing.

5. The device of claim 2 wherein the motion of said plug is both rotational, about the longitudinal axis of said body portion, and reciprocal along said axis.

6. A fluid sampling device comprising a longitudinally extending cylindrical housing having an internal axial bore, said housing including a plurality of paired, spaced apart passageways extending from the exterior of said housing toward the bore therein, each pair of passageways comprising an inlet and outlet for a given fluid stream; aligned channels in said housing each connecting the inlet and outlet passageways of a given pair, said channels being open to the core of said housing; a reciprocally and rotatably movable plug located within said bore, said plug having surfaces in sealing juxtaposition with said open channels and further including at least one cavity of fixed volume; movement of said plug placing said cavity in alignment with a single chosen channel while leaving unimpaired the sealing juxtaposition of said plug surfaces and said open channels.

7. A fluid sampling device comprising a hollow tapered housing of circular cross section; a plug rotatably mounted therein; said housing including a smooth internal face defining the hollow interior thereof and further including a plurality of radially distributed pairs of associated passages leading from the exterior of said housing toward the interior thereof; interiorly opening channels in said smooth internal surface connecting each member of a given pair of passages; a sampling cavity in said plug opening to the face thereof which is in sealing juxtaposition to said internal face of said housing; rotation of said plug in said housing causing seriatim alignment of said cavity with each of said channels while leaving undisturbed the fluid sealing juxaposition of said housing face and said plug face.

References Cited in the file of this patent

UNITED STATES PATENTS

| | | |
|---|---|---|
| 2,811,041 | Beatty | Oct. 29, 1957 |
| 2,830,738 | Sorg et al. | Apr. 15, 1958 |
| 2,856,150 | McDonald | Oct. 14, 1958 |
| 2,864,254 | McDonald et al. | Dec. 16, 1958 |

FOREIGN PATENTS

| | | |
|---|---|---|
| 860,850 | Great Britain | Feb. 8, 1961 |

UNITED STATES PATENT OFFICE
CERTIFICATE OF CORRECTION

Patent No. 3,116,642 January 7, 1964

Harry E. Weir

It is hereby certified that error appears in the above numbered patent requiring correction and that the said Letters Patent should read as corrected below.

Column 4, line 39, for "channels to" read -- channels so --.

Signed and sealed this 16th day of June 1964.

(SEAL)
Attest:

ERNEST W. SWIDER
Attesting Officer

EDWARD J. BRENNER
Commissioner of Patents